Nov. 2, 1937.  J. D'ARCEY  2,098,085
LIQUID LEVEL INDICATOR
Filed Sept. 18, 1934  2 Sheets-Sheet 1
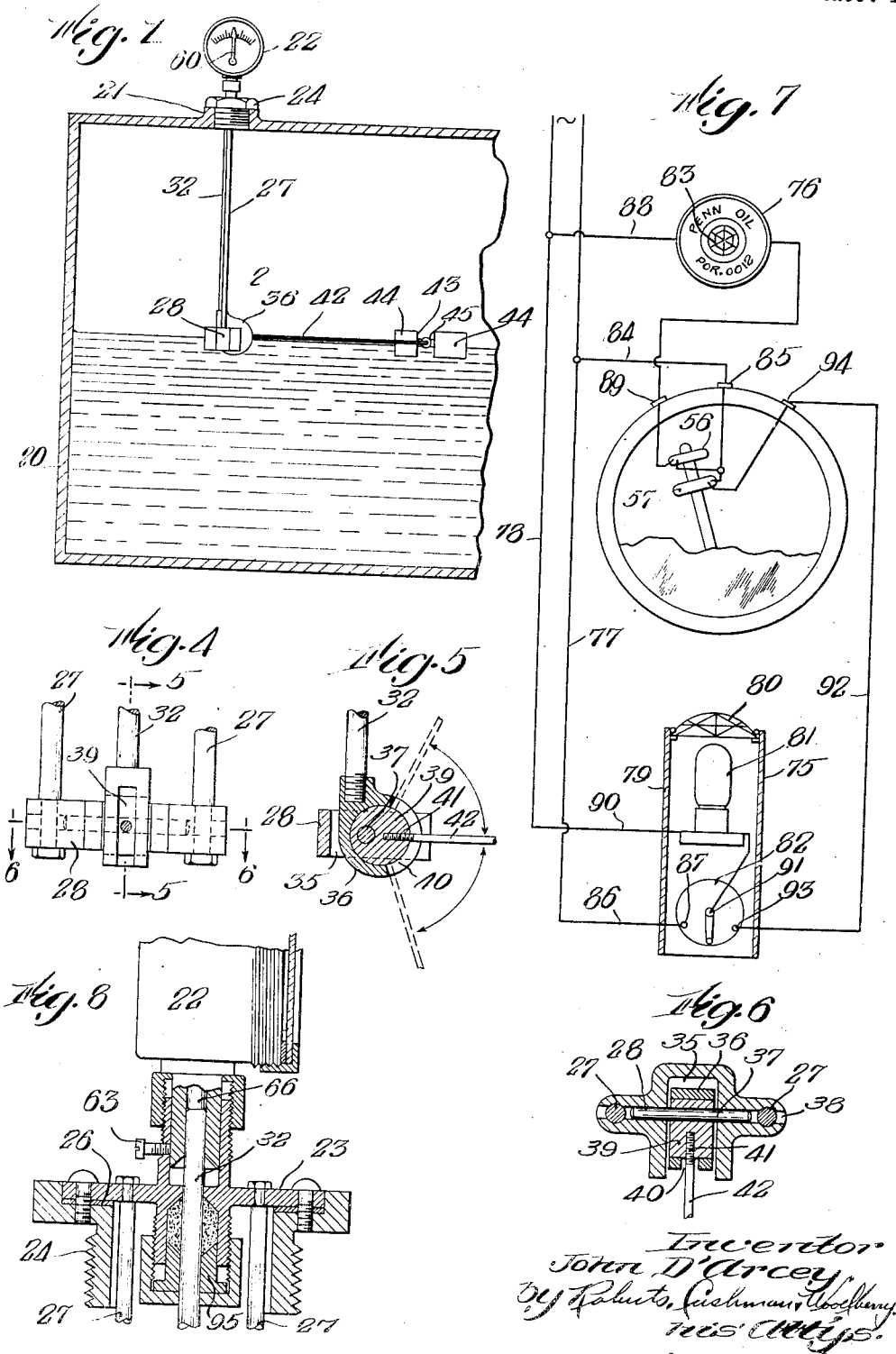
Inventor
John D'Arcey
by Roberts, Cushman & Woodberry
his Attys.

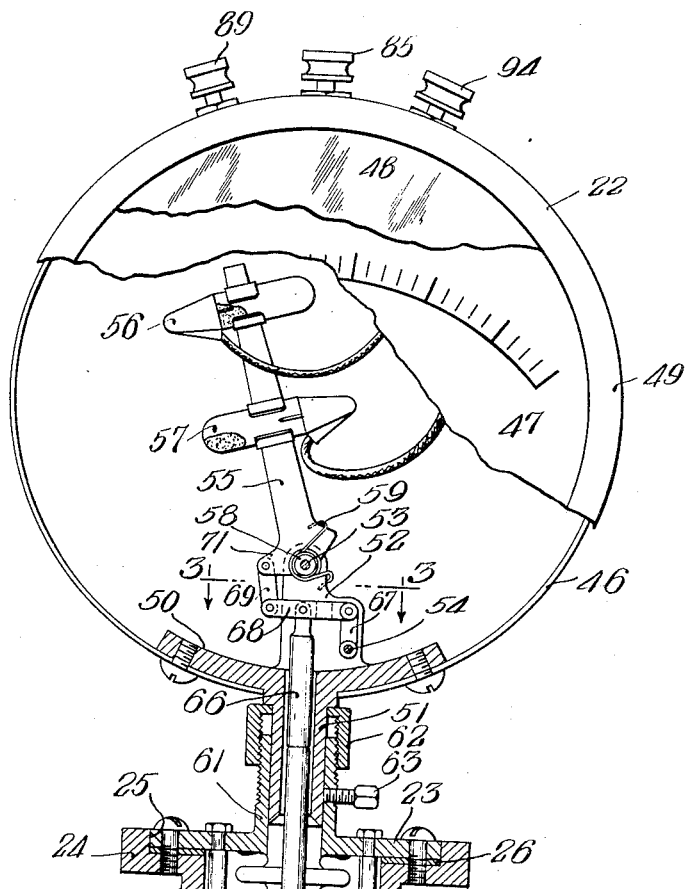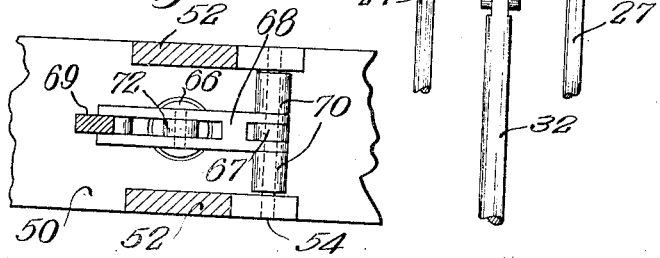

Patented Nov. 2, 1937

2,098,085

UNITED STATES PATENT OFFICE 2,098,085

LIQUID LEVEL INDICATOR

John D'Arcey, Chelsea, Mass.

Application September 18, 1934, Serial No. 744,515

10 Claims. (Cl. 73—317)

This invention relates to an improvement in a liquid level indicator applicable for determining the liquid contents of a tank or other receptacle containing oil or other liquid.

The primary object of this invention is to provide an indicator by which the contents of a sealed container can be determined without breaking the seal and allowing the escape of fumes or vapor therefrom.

A further object thereof is to provide an indicator including a pivotally supported float the pivotal movement of which is transmitted through a movement of rotation into movement of reciprocation.

Another object thereof is to provide an indicator that can be easily installed in a tank through the internally threaded opening usually provided and includes a gauge which can be removed if desired without breaking the seal or permitting the escape of vapors from the tank.

Another object thereof is to provide an indicator including a gauge the needle of which can be adjusted without the necessity of removing the indicator from the container or breaking the seal thereof.

Another object thereof is to provide in such indicator in addition to a visible gauge at the container, one or more gauges which may be located at various points as desired and one or more signal devices which act as a warning that the contents of the container have reached a certain low limit and that it should be refilled.

Other objects will appear from a consideration of one embodiment of this invention set forth in the following description and illustrated in the accompanying drawings reference to which is made in the description and in which Fig. 1 is a sectional elevation of a portion of a receptacle or tank equipped with an indicator embodying this invention;

Fig. 2 is an enlarged view partly in cross section of the upper portion of the indicator including the gauge;

Fig. 3 is a sectional view, taken along the line 3—3 of Fig. 2 of part of the gauge needle operating mechanism;

Fig. 4 is a view in side elevation of an element of the indicator;

Figs. 5 and 6 are sectional views of that element taken along the lines 5—5 and 6—6 respectively of Fig. 4;

Fig. 7 is a diagrammatic view showing one type of electric circuits by which supplementary indicators are connected to the indicator on the tank so that they will disclose the amount of fluid in the tank; and Fig. 8 is a view in cross section of an alternate construction of a portion of the indicator.

This invention has been shown in the drawings and will be described herein as embodied in a device particularly applicable for use to indicate the level of oil in a tank. It will be understood however that the invention is not limited thereto and that it is applicable for use in many forms and in many types of installations.

The oil tank 20 in Fig. 1 is provided with an annular internally threaded boss 21 in its upper wall on which the indicator gauge 22 is supported in convenient position for examination. The gauge 22 is supported upon a plate 23 removably secured to an annular externally threaded plug 24 mounted in the boss 21. The upper face of the plug 24 is here shown provided with a pocket 25 which receives the plate 23. A gasket 26 rests on the base of the pocket to seal the tank. A pair of posts 27 fixed at their upper ends to the plate 23 extend into the tank through the plug 24 and carry at their lower ends a saddle 28 (Fig. 4).

Mounted upon the plate 23 and depending therefrom through the plug 24 is a bellows 30 closed at one end and sweated or otherwise permanently secured to the plate 23 (see Fig. 2). Secured to the underside of the base of the bellows 30 is a yoke 31 and a rod 32 pivoted at its upper end in the yoke.

The saddle 28 is provided with a U-shaped recess 35 open at top and bottom. A block 36 secured to the lower end of the rod 32 is received in the recess 35. Extending across the recess and supported at its ends in the saddle 28 is a pin 37. As shown in Fig. 6 the pin 37 lies in a hole 38, drilled through the saddle from one side to the other and the posts 27 which support the saddle close the hole at both ends and hold the pin therein. Eccentrically mounted on the pin 37 and rotatable within a pocket in the block 36 is a disk 39. A slot 40 cut in the outer face of the block exposes the periphery of the disk. Mounted at one end in a hole 41 through the periphery of the disk is an arm 42 which carries at its outer end a float 43. The float 43 may be of any well known type and is here shown as comprising two buoyant members 44 spaced apart on a frame 45 pivotally joined to the end of the arm 42. One of the members 44 is preferably larger than the other so that the float will normally take a position similar to that shown in Fig. 1 with the larger member further from the saddle 28 than the smaller member.

The float 43 rests on the surface of the liquid and will rise or fall as the contents of the tank increase or decrease (see Fig. 5). This movement of the float causes the arm 42 to rotate the disk 39 either around the pin 37 or with the pin 37 in the hole 38. The rotation of the disk causes the reciprocation of the rod 32 and hence a contraction or expansion of the bellows 30.

The gauge 22 is of the well known disk type comprising a dished housing 46, a dial plate 47 preferably of bakelite or other dielectric material and a glass plate 48 secured in any suitable way as by a bezel 49. Fixed to the wall of the gauge within the housing behind the dial plate is a curved bracket 50 from which a hollow post 51 projects through a hole in the wall of the gauge. Carried by the bracket 50 are a pair of spaced walls 52 which extend into the housing and support a pair of pins 53 and 54. Fixed to the pin 53 is an arm 55 upon which mercury switches 56 and 57 are secured in any suitable manner. The arm 55 is provided on both sides with bosses 58 which receive the pin 53 and space the arm between the walls 52. A spring 59 engages at one end the arm 55 and at the other end a wall 52. The needle 60 is secured to the end of the pin 53 in any well known manner and reciprocates over the dial plate 47 in unison with the arm 55.

The gauge is mounted upon the plate 23 by means of the post 51 which is inserted into the center of a hollow externally threaded sleeve 61 carried by the plate and an internally threaded collar 62 flanged as its upper end surrounding the post 51 and engaging the threads on the sleeve. The post 51 and walls 52 are preferably made integral with the bracket 50 and the sleeve 61 is preferably made integral with the plate 23 as shown in Fig. 2 but some or all could be made separately if desired.

The reciprocation of the rod 32 is transmitted to the arm 55 and needle 60 by means of a rod 65 fixed to the base of the bellows 30, a second rod 66 resting on the rod 65 and an articulated structure comprising a chain of links 67, 68 and 69. The rods 65 and 66 together form a column which extends through the center of the post 51. The link 67 at one end of the chain is pivoted upon the pin 54, being spaced between the walls by collars 70, and the link 69 at the other end of the chain is pivotally attached to an ear 71 offset from one side of the arm 55. The upper rod 66 terminates in a tongue 72 pivotally attached to the center link 68 (see Figs. 2 and 3).

It will be apparent from the above description that the gauge 22 can and ordinarily will be mounted in position after the remainder of the indicator has been installed in the tank. This installation can be made at any time regardless of the amount of liquid in the tank. The plate 23, plug 24, posts 27, saddle 28, arm 42 and the elements associated therewith can be inserted as a unit through the boss 21 in the tank 20. The float 44 is of such dimension that it can be passed through the hole in the boss. After the parts are installed the plug 24 is fixed in the boss 21 and the plate 23 secured by screws or other suitable means to the plug. The gauge 22 is then mounted upon the plate 23 in the manner above described, and the position of the needle 60 is adjusted, the gauge being raised or permitted to lower by means of the collar 62 and set by means of the set screw 63.

In addition to the main indicator hereinabove described it has often been found desirable to provide one or more supplementary indicators by which the condition of the tank may be determined at a distance. As shown in Fig. 7 of the drawings there may be an indicator 75 adjacent the filling nozzle usually outside the building and an indicator 76 located at some convenient point in the building to give warning when the amount of oil in the tank falls below a predetermined minimum.

Referring to Fig. 7 it will be noted that the mercury switches 56 and 57 form parts of circuits from a source of power not shown and close the circuits under certain conditions. The main lead 77 is connected to both the switches 56 and 57, and the other main lead 78 is connected to the indicators 75 and 76. The indicator 75 comprises a housing 79 closed at one end by a lens 80 and including an electric bulb 81 and a hand operated double throw switch 82. The indicator 76 comprises a bulb not shown and a lens 83 bearing advertising or other indicia so that when the bulb is lighted the indicia is brought prominently into view.

The main lead 77 is connected by a lead 84 through a binding post 85 with the mercury switches 56 and 57 and by a lead 86 with a button 87 of the switch 82. The main lead 78 is connected by a lead 88 through the bulb of the indicator 76 and a binding post 89 to the switch 56, and by a lead 90 through the bulb 81 of the indicator 75 to the center post 91 of the switch 82. The switch 57 is connected by a lead 92 to a second button 93 of the switch 82.

It will be understood that the mercury switches each contain a ball of mercury which moves from one end to the other of a closed tube as the positions of the switches change. The leads 84 and 88 enter the switch 56 near the end which receives the ball of mercury when the tank is nearly empty and the leads 84 and 92 enter the switch 57 near the end which receives the ball of mercury when the tank is nearly full. Hence when the tank is nearly empty the leads 84 and 88 are electrically connected by the ball of mercury and the indicator 76 gives warning by the lighting of the bulb through the circuit thus completed. When as here shown the lens 83 carries the name and telephone number of an oil company the observer is advised who to notify. The indicator 75 at the filling nozzle enables the oil man to determine if the tank needs filling. The handle of the switch 82 is moved into contact with the button 93 and if the bulb 81 does not light the tank needs filling. In order to avoid overflowing the tank due to failure of the bulb to light even if the tank were filled and the circuit through the bulb completed a test can be made by moving the switch handle into contact with the button 87 and thus completing a circuit through the bulb 81. If the bulb then lights the switch handle is swung back into contact with the button 93 and the tank filled until the bulb 81 lights when the switch 57 has been tilted to the right and the ball of mercury closed the circuit through the leads 84 and 92.

Fig. 8 illustrates a modification in the mounting of the rod 32 and comprises the substitution of a stuffing box 95 for the bellows 30. The rod 32 raised or lowered through the stuffing box 95 actuates the rod 66 and thereby causes the needle of the gauge 22 to indicate the condition of the tank.

While this invention has been shown and described as applied to a tank containing fuel it is understood that I do not thereby limit the employment of the invention thereto and that the invention may be incorporated in other embodiments, and applied to other uses without departing from the spirit and scope of the invention as set forth in the following claims.

I claim:

1. Means for indicating the level of liquid in a receptacle comprising a plug mounted in an opening in the receptacle, a saddle in said receptacle suspended from said plug, a pin carried by said saddle, a rotatable disk eccentrically mounted on said pin, an arm extending from said disk, a float on said arm, said float being raised or lowered by changes in the level of the liquid thereby rotating said disk, a block having a pocket in which said disk is mounted and which is raised and lowered by the rotation thereof, a rod having a vertical movement of translation carried by said plug, a gauge operated by the movement of said rod, and means for imparting the movement of the block to the rod.

2. Means for indicating the level of liquid in a receptacle comprising a plug mounted in an opening in the receptacle, a saddle in said receptacle suspended from said plug, a pin carried by said saddle, a rotatable disk eccentrically mounted on said pin, an arm extending from said disk, a float on said arm, said float being raised or lowered by changes in the level of the liquid thereby rotating said disk, a block having a pocket in which said disk is mounted and which is raised and lowered by the rotation thereof, an expansible bellows suspended from said plug into the receptacle, a rod carried by said bellows and having a movement of translation as the bellows is collapsed or expanded, and means connecting said block and said bellows whereby the movement of the block causes the bellows to expand or contract and the rod to move.

3. Means for indicating the level of liquid in a receptacle comprising a plug mounted in an opening in the receptacle, a saddle in said receptacle suspended from said plug, a pin carried by said saddle, a rotatable disk eccentrically mounted on said pin, an arm extending from said disk, a float on said arm, said float being raised or lowered by changes in the level of the liquid thereby rotating said disk, a block having a pocket in which said disk is mounted and which is raised and lowered by the rotation thereof, expansible bellows suspended from said plug into the receptacle, a rod carried by said bellows and having a movement of translation as the bellows is collapsed or expanded, a gauge operated by the movement of said rod, and means connecting said block and said bellows whereby the movement of the block causes the bellows to expand or contract and the rod to move and operate the gauge.

4. Means for indicating the level of liquid in a receptacle comprising an annular plug mounted on the receptacle, posts depending from said plug into said receptacle, a saddle fixed to said posts, a pin carried by said saddle, a rotatable disk eccentrically mounted on said pin, an arm extending from said disk, a float on said arm, said float being raised or lowered by changes in the level of the liquid thereby rotating the disk, an expansible bellows seated in the center of said plug, a rod carried by said bellows and having a movement of translation as the bellows is contracted or expanded, and means attached to said bellows and actuated by said disk to cause the bellows to expand or contract and the rod to move.

5. Means for indicating the level of liquid in a receptacle including a gauge comprising a dial, a pointer movable thereover, an annular plug in an opening in said receptacle on which plug the gauge is supported, and means for moving said pointer including a bellows seated in the center of said plug and depending therefrom into said receptacle, a rod carried by said bellows for actuating the pointer, and means movable in response to any change in the level of the liquid for expanding or contracting said bellows to raise or lower said rod and cause it to actuate said pointer.

6. Means for indicating the level of liquid in a receptacle including a gauge comprising a dial, a pointer movable thereover, an annular plug in an opening in said receptacle on which plug the gauge is supported, and means for moving said pointer including a bellows seated in the center of said plug and depending therefrom into said receptacle, a rod carried by said bellows, means movable in response to any change in the level of the liquid for expanding or contracting said bellows to raise or lower said rod and cause it to actuate said pointer and means between the bellows and the gauge and accessible from without the gauge to adjust the relation of said rod and said pointer.

7. Means for indicating the level of liquid in a receptacle comprising a plug mounted in an opening in the receptacle, posts depending from said plug into said receptacle, a saddle fixed to said posts, a pin carried by said saddle, a rotatable disk eccentrically mounted on said pin, an arm extending from said disk, a float on said arm, said float being raised or lowered by changes in the level of the liquid thereby rotating the disk, a block having a pocket which receives said disk, the rotation of the disk causing the block to rise or fall, a rod fixed to said block and extending between said posts through said plug and a gauge carried by said plug and actuated by said rod.

8. Means for indicating the level of liquid in a receptacle comprising a plug mounted in an opening in the receptacle, posts depending from said plug into said receptacle, a saddle fixed to said posts, a pin carried by said saddle and fixed in position by said posts, a rotatable disk eccentrically mounted on said pin, an arm extending from said disk, a float on said arm, said float being raised or lowered by changes in the level of the liquid thereby rotating the disk, a block having a pocket which receives said disk, the rotation of the disk causing the block to rise or fall, a rod fixed to said block and extending between said posts through said plug and a gauge carried by said plug and actuated by said rod.

9. Means for indicating the level of liquid in a receptacle having an annular boss in its upper wall including a float adapted to rest on the level of the liquid, an annular plug removably secured to said boss, a plate removably secured to said plug, said float being carried by said plate and insertible into the receptacle through the boss upon removal of the plug regardless of the level of the liquid in the receptacle and a gauge removably supported by and adjustable relative to said plate.

10. Means for indicating the level of liquid in a receptacle having an annular boss in its upper wall including a float adapted to rest on the level of the liquid, an annular plug removably secured to said boss, a plate removably secured to said plug, means carried by said plate and extending through the center of said plug from which means said float extends, said float and means being insertible into the receptacle through the boss upon removal of the plug regardless of the level of the liquid in the receptacle, said plug being thereafter secured to said boss, and said plate being then secured to said plug and a gauge removably supported by and adjustable relative to said plate.

JOHN D'ARCEY.